United States Patent
Olsson et al.

(10) Patent No.: US 7,725,381 B2
(45) Date of Patent: May 25, 2010

(54) TRADER COUNTERPART PRECONDITION IN ANONYMOUS TRADING SYSTEM

(75) Inventors: Johan L. Olsson, Lidingö (SE); Daniel Jensen, Stockholm (SE); Sven Allebrand, New York, NY (US); Daniel Negishi, Stockholm (SE); Ulf Ahlenius, Bromma (SE)

(73) Assignee: OMX Technology AB, Stockholm (SE)

( * ) Notice: Subject to any disclaimer, the term of this patent is extended or adjusted under 35 U.S.C. 154(b) by 483 days.

(21) Appl. No.: 11/396,956

(22) Filed: Apr. 4, 2006

(65) Prior Publication Data

US 2007/0244790 A1   Oct. 18, 2007

(51) Int. Cl.
*G06Q 40/00* (2006.01)
(52) U.S. Cl. .......................................... 705/37; 705/35
(58) Field of Classification Search ................... 705/37, 705/38, 36 R
See application file for complete search history.

(56) References Cited

U.S. PATENT DOCUMENTS

| | | | |
|---|---|---|---|
| 5,136,501 A | | 8/1992 | Silverman et al. |
| 5,375,055 A | * | 12/1994 | Togher et al. ................. 705/37 |
| 5,924,083 A | * | 7/1999 | Silverman et al. ............. 705/37 |
| 6,996,540 B1 | * | 2/2006 | May ............................. 705/37 |
| 6,996,541 B2 | * | 2/2006 | Togher et al. ................. 705/37 |
| 7,003,488 B2 | * | 2/2006 | Dunne et al. .................. 705/37 |
| 7,024,386 B1 | * | 4/2006 | Mills et al. .................... 705/37 |
| 2002/0065760 A1 | * | 5/2002 | Wiesehuegel et al. ......... 705/37 |
| 2002/0116317 A1 | | 8/2002 | May |
| 2003/0083973 A1 | * | 5/2003 | Horsfall ........................ 705/37 |
| 2004/0015430 A1 | | 1/2004 | May |
| 2004/0260639 A1 | | 12/2004 | Lundberg et al. |

FOREIGN PATENT DOCUMENTS

| | | |
|---|---|---|
| GB | 2 366 021 | 2/2002 |
| WO | WO 99/19821 | 4/1999 |
| WO | WO 00/68846 | 11/2000 |
| WO | WO 01/50776 | 7/2001 |
| WO | WO 01/98963 | 12/2001 |

OTHER PUBLICATIONS

Anonymous "Hong Kong Joins London and New York on Dealing 2000" Jul. 25, 1989 PR Newswire p. 1.*
Kersnar, Scott "Sold To The Highest Bidder (Online auctions in the retail sector are increasingly popular, but the retail auction model does not fit well with the workings of the mortgage business )" Sep. 2000 Mortgage Technology , v 7 , n 6 , p. 42+.*
Talmor, Sharona "Critical aims. (Tradepoint Investment Exchange)" Dec. 1995 Banker , v145 , n838 , p. 76(2).*

* cited by examiner

*Primary Examiner*—Kelly Campen
(74) *Attorney, Agent, or Firm*—Nixon & Vanderhye P.C.

(57) ABSTRACT

An anonymous trading system that enables users to select counterparty requirements. Each user has an interface to add trader preconditions regarding available counterparties. Those trader preconditions include an expression of the user's willingness to trade with selected counterparties. The added trader preconditions are collected from the users and combined into a trader matrix. The trader matrix is used to determine matching criteria for orders sent in by users. An anonymous trading system and a terminal for sending orders to an anonymous trading system are also provided.

18 Claims, 4 Drawing Sheets

|  | Firm A | Firm B | Firm C | Firm D | Firm X |
|---|---|---|---|---|---|
| Firm A |  | OK | OK | NO | OK | NO | OK | OK | OK |
| Credit |  |  |  | 100 |  | 200 |  |  |

|  | Firm A | Firm B | Firm C | Firm D | Firm X |
|---|---|---|---|---|---|
| Firm B | OK |  | NO | OK | OK |

FIG. 6

|  | Firm A | Firm B | Firm C | Firm D | Firm X |
|---|---|---|---|---|---|
| Firm C | NO | OK |  | OK | OK |

FIG. 7

|  | Firm A | Firm B | Firm C | Firm D | Firm X |
|---|---|---|---|---|---|
| Firm D | NO | OK | OK |  | OK |

FIG. 8

|  | Firm A | Firm B | Firm C | Firm D | Firm X |
|---|---|---|---|---|---|
| Firm X | OK | OK | OK | OK |  |

FIG. 9

|  | Firm A | Firm B | Firm C | Firm D | Firm X |
|---|---|---|---|---|---|
| Firm A |  | OK | NO | NO | OK |
| Firm B | OK |  | NO | OK | OK |
| Firm C | NO | NO |  | OK | OK |
| Firm D | NO | OK | OK |  | OK |
| Firm X | OK | OK | OK | OK |  |

FIG. 10

| User | B.Size | Bid | Offer | O.Size | User |
|---|---|---|---|---|---|
| Firm C | 5 | 99,2 | 99,1 | 10 | Firm B |
| Firm A | 10 | 99,0 | 99,3 | 5 | Firm D |
|  |  |  |  |  |  |

FIG. 11

| User ID | B.Size | Bid | Offer | O.Size | User ID |
|---|---|---|---|---|---|
| 03 | 5 | 99,2 | 99,1 | 10 | 12 |
| 99 | 10 | 99,0 | 99,3 | 5 | 21 |
|  |  |  |  |  |  |

FIG. 12

| User ID | B.Size | Bid | Offer | O.Size | User ID |
|---|---|---|---|---|---|
| 99 | 10 | 99,0 | 99,1 | 10 | 12 |
|  |  |  |  |  |  |
|  |  |  |  |  |  |

FIG. 13

| User ID | B.Size | Bid | Offer | O.Size | User ID |
|---------|--------|------|-------|--------|---------|
| 03 | 5 | 99,2 | 99,1 | 10 | 12 |
| 99 | 10 | 99,0 | 99,3 | 5 | 21 |
| | | | | | |

TRADER COUNTERPART PRECONDITION IN ANONYMOUS TRADING SYSTEM

TECHNICAL FIELD

The present application relates to an anonymous trading system for trading financial instruments and to a terminal for use in sending orders to an anonymous trading system for trading financial instruments.

BACKGROUND

In the financial market it is known to have anonymous trading systems for trading in financial instruments. The term "financial instrument" is in the present application used in a broad sense and encompasses any tradable item (stocks, bonds, securities, cash, foreign exchange, options, gas, electricity, etc.) or group of items that is traded through matching of counterparty orders (bid, offer). An order normally includes a price and a volume of the item(s) or combination of items. The price and the volume can be viewed as order preconditions that has to be met in order for a match (deal) to take place.

Although one main purpose of an anonymous trading system is to establish a fair and equal marketplace where no user or party knows the origin of any specific order (bid or offer) on the system, there is sometimes a problem for parties who do not wish to trade with specific counterparties. The most common reason for not trusting other parties is creditability, but there may be other reasons as well.

In U.S. Pat. No. 5,136,501 an anonymous trading system is disclosed where the users may enter credit requirements for counterparties via trader terminals. As long as the credit limit is not exceeded, trading can go on as usual. If the credit is exceeded, matchable orders from those parties will not be matched by the system until the credit once again is below the credit limit.

All orders thus retain their anonymity, while the parties can ascertain that no deals (trades) will be made outside a specified credit limit, thus reducing risks.

The anonymous trading system also broadcasts information to the trader terminals. Such information essentially relates to a selected order depth from all present orders in the trading system. Trader terminals may be modified to further limit the order depth displayed to the user. No information regarding entered counterparty credit limits is broadcast. Any orders that normally would result in a match, but where such match is not allowed due to credit limit being exceeded, are rejected by the trading system. Thus, no crossing orders may exist in the order book (i.e. bids that are better than the best offer and vice versa may not coexist in the order book).

In US Patent Application 2003/0083973 an anonymous trading system having credit limit is also disclosed. The trading system can, when the credit is insufficient for fulfilling a complete order, send a message to the parties where the parties are identified and asked whether they wish to proceed with making the deal (partially or in full) or not. This can be viewed as a right to refuse a trade and will in this application be referred to as trade refusal.

Although the above systems provide some possibilities for a user to reduce financial risks there is a need of an even more versatile and easy-to-use system that allows the users of an anonymous trading system to reduce their risks but also to define their acceptable market in an individual manner.

SUMMARY

A method for use in an anonymous trading system is provided in which users are enabled to select counterparty requirements, the method comprises providing each user with an interface via which each user may add trader preconditions regarding available counterparties where the trader preconditions at least comprises an expression of the user's willingness to trade with selected counterparties, collecting all added trader preconditions from the users, combine all trader preconditions into a trader matrix and using the trader matrix for determining matching criteria for orders sent in by users.

The trader preconditions will together with order preconditions (price, volume, etc.) form a combined set of preconditions required to be met for a match to take place. This makes it necessary to have a trader system that either allows crossing orders (existing bid and offers that would match according to order preconditions only) or that refuses to accept a crossing order into the order book.

The trader preconditions given by the users could be limited to only marking which counterparties that they do not wish to trade with (for whatever reason). This avoids the circumstantial manner of selecting specific credit limits etc.

It should be noted that a user could be an individual person, a legal entity or a group of persons/entities. A broker firm may for instance set up certain preconditions for the firm and allow the individual traders within the firm to determine further preconditions.

The trader preconditions can be made to be changeable, allowing the users to change the trader preconditions during a trading day. Preferably, the number of such changes is limited to avoid any possibilities of misuse or abuse of the trading system.

The interface may further be formed to allow for selecting trader preconditions for each financial instrument or group of financial instruments, for bids and offers separately or for a combination of both.

Advantageously, further trader preconditions may be added to the basic willingness to trade criteria. Such preconditions includes inter alia credit limits (based on individual orders or accumulated) and trade refusal requirements.

In order to allow users to identify which orders that have the same origin, a unique identity alias can be assigned to each user and only the unique identity alias is displayed in connection with the orders. To maintain a high level of anonymity new unique identity aliases are assigned when predetermined conditions are met. One such condition may be the start of a new trading day (period, session); another may be that a specific number of changes in trader preconditions have been made.

The use of a trader matrix and alias ID's for the users also provides for more flexible and less demanding information distribution services. General broadcasts of information can be used effectively to provide information that previously required directed broadcasts in order to update information about order book status and other information.

An anonymous trading system for trading financial instruments is provided which comprises a matching unit for matching received orders having corresponding order preconditions and an order book for storing unmatched orders, wherein the anonymous trading system further comprises a trader matrix containing trader preconditions at least relating to a user's willingness to trade with selected counterparties, which trader preconditions represents a further requirement for the matching unit to match received orders.

A terminal for use in sending orders to an anonymous trading system is provided, which terminal comprises an interactive trader preconditions interface into which the user may add trader preconditions relating to willingness to trade with selectable counterparties.

The terminal may include an information display filter that uses ID alias information regarding users and trader preconditions to filter disseminated information from the trading system regarding inter alia order book contents. One way of filtering is to differentiate orders that cannot be matched due to trader preconditions from orders that cannot be matched due to order preconditions. Differentiation can be made by providing different colouring, fonts, etc for the orders or by removing unmatchable orders completely from what will be displayed on the terminal.

It is also feasible to arrange the terminal display filters such that they also collect and form a trader matrix based on trader preconditions entered by other users. In such version, it is no longer required that the trading system comprises any trader matrix information as matching criteria. However, such disposition of functionality would require that the trading system checks each (feasible) match with the relevant terminals to receive a go ahead from these before proceeding with the matching process.

Further details, advantages and modifications will be evident from the following description of non-limiting, examples embodiments.

BRIEF DESCRIPTION OF THE DRAWINGS

FIG. 5 shows a third alternative example embodiment of an interface for adding trader preconditions, FIGS. 6-9 shows additional examples of the embodiment of FIG. 2 representing different users, FIG. 10 shows an example embodiment of a trader matrix compiled from the trader preconditions shown in FIGS. 2 and 6-9, FIG. 11 shows an example of a trading situation with bids and orders from users, FIG. 12 shows an example of information distributed to users based on the trading situation in FIG. 11, FIG. 13 shows an example of how the distributed trading information in FIG. 12 can be displayed to a user after consideration of trader preconditions in the trader matrix in FIG. 10.

DETAILED DESCRIPTION

Figures 1, 2, 3, 4:
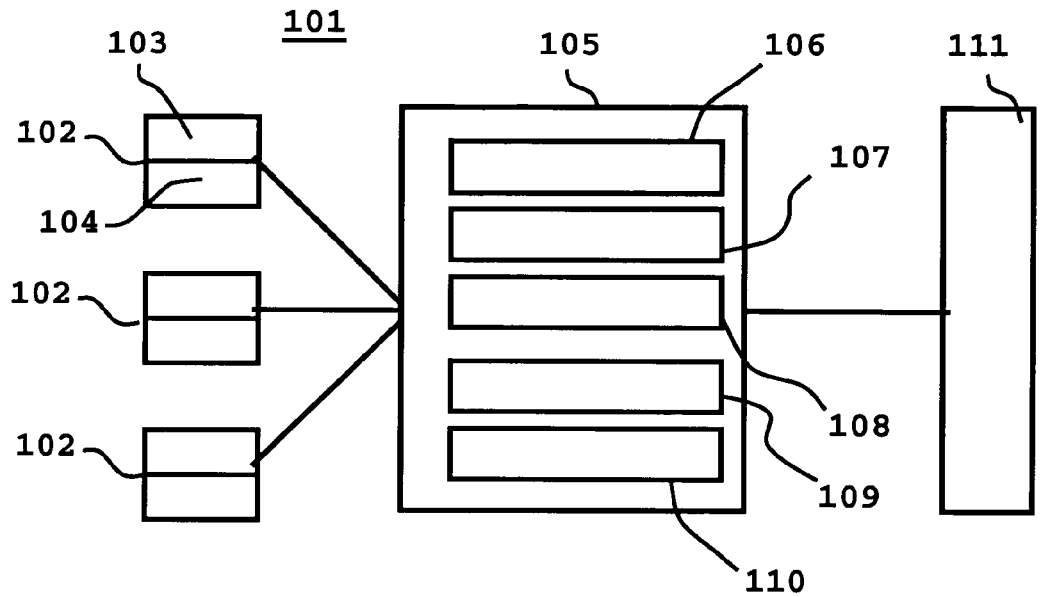
FIG. 1 shows an example embodiment of a financial market system.
FIG. 2 shows an example embodiment of an interface for adding trader preconditions.
FIG. 3 shows a first alternative example embodiment of an interface for adding trader preconditions.
FIG. 4 shows a second alternative example embodiment of an interface for adding trader preconditions.

FIG. 1 shows an example embodiment of a financial market system 101. The financial market system 101 is used for trading in financial instruments. In this particular case, the financial market system is an anonymous market place, i.e. no-one is supposed to know the identity of the user behind a certain order.

The financial market system 101 includes three subsystems, each fulfilling certain main functions. In this case, the first subsystem is represented by terminals 102. A terminal 102 is used by a user or trader on the financial market system 101 to receive information about the market via a display 103 and to add information (e.g., placing orders) to the market via a input board 104.

Naturally, display 103 should be regarded in broad sense as any mechanism for presenting information, although preferably a mechanism for visually presenting the information, and the input board 104 should be regarded in broad sense as any mechanism for inputting information, although preferably a mechanism for physically pressing a key (e.g., a keyboard, mouse, etc). The display 103 and input board 104 could also be formed as a common device, such as an interactive screen.

The terminals 102 communicate with a trading system 105 in which the main market events take place. The market system 105 in this embodiment comprises a number of functional units, namely a matching unit 106 for matching orders sent in by the users, an order book 107 for storing unmatched orders, a trader matrix 108 for compiling trader information sent in by the users, a user book 109 for identifying allowable users as well as awarding unique alias for the users and an information dissemination unit 110 for inter alia distributing (broadcasting) information from the trading system 105 to the terminals 102.

The figure only displays a symbolic rendering of some of the functions that are preferably implemented in the trading system 105 (by hardware and/or software) and not an actual hardware or software architecture. From a hardware point of view, the trading system 105 may be set up in several different ways, using a number of servers and other well known components. Communications can be made through Ethernet, Internet, wireless, fibre optics, etc.

Finally, there is a settlement system 111 for finalizing (settling) all matched orders.

In an anonymous market system, there is the specific (user) problem of not being able to determine who a possible counterparty to an order (bid or offer) is. This is for certain systems solved in one respect by allowing the users to put in credit amounts that set a limit on trading between certain indicated parties.

A different solution is provided here. The users—individually or collectively (firms)—can choose who they want to deal with, and the trader system then handles the orders accordingly.

In order for the users to be able to make the choice, an appropriate interface is required at each terminal 102. In FIG. 2 an example of such a trader preconditions interface 201 is shown. The trader preconditions interface 201 allows the user, in this case Firm A, to enter appropriate preconditions for handling trading. The example given includes a limited number of users (Firms A, B, C, D and X) to provide a clear and simple description. In FIG. 2, the trader preconditions interface 201 is basically a matrix with a row for the user Firm A and a column for each counterparty (Firm B, C, D and X) where each cell can be used for entering the appropriate preconditions. In this case, Firm A is willing to trade with all possible counterparties and has entered OK in each cell (the cell for Firm A is shaded in this example as they are not allowed to trade with themselves—this cell could have been completely removed from the trader preconditions interface 201 for Firm A and thus not displayed at all, but it should be noted that for certain instruments trading can be made between brokers within the same firm, so there may be cases when this cell can be used). Naturally, the system can be devised so that empty cells also indicate willingness to trade and by leaving all cells empty Firm A would in such case have given their consent to trade with all counterparties.

A slightly modified interface is shown in FIG. 3, where a more detailed trader preconditions interface 301 is shown. In this case, the system is adapted to differentiate between willingness to sell and willingness to buy, i.e. a trade order is normally a bid (buy) or offer (sell). There may be circumstances where a user is willing to sell to all counterparties but not buy from all (or vice versa). Thus, each column now comprises a first cell 302 for bid orders and a second cell 303 for offer orders. As can be seen, Firm A has entered the preconditions NO for the first cell 302 for Firm C, but a OK in the second cell 303 for Firm C, indicating that they will buy from Firm C but not sell to Firm C.

Even more preconditions can be used. This is indicated in FIG. 4, where a trader preconditions interface 401 is shown displaying an additional row 402 for entering credit preconditions. The credit preconditions could relate to an order related credit, meaning that for orders (buy or sell) exceeding the credit amount given, there will be no matches between the users or an accumulated credit which limits the total outstanding credit one user may have towards another before trading between them stops.

For instance, Firm A has indicated a credit of 100 for Firm C. Assume Firm A puts out an order to sell which amounts to a total price of 110 and Firm B puts out an order to buy which completely matches the sell order from Firm A, then one of several possible events may take place.

One outcome is that these two orders will not be matched at all since the amount 110 exceeds the credit of 100. Another is that there will be a partial deal for the amount of 100 between Firm A and C. In the latter case, there will be remaining orders from Firm A (sell for 10) and Firm C (buy for 10) which theoretically match. With accumulated credit, the first matched deal must first be settled before a second deal can be made between Firm A and C. Thus, both orders will remain unmatched. For order credit, the amount 10 is lower than 100 and theoretically a new match may be made between Firm A and C for the remaining 10.

A blank cell as exemplified by trade preconditions cell 405 indicates that the there is no credit limit.

A different way of handling credit and trading willingness is also indicated in FIG. 4. For Firm X Firm A has entered TR in a trade preconditions cell 402 for Firm X. TR is here used to indicate a Trade Refusal function. Trade refusal means that Firm A wishes to have the benefit of refusing a possible deal when a match is found towards an order from Firm X. This means that for such specific orders, the anonymity of the market system is not upheld. If Firm A accepts to trade, the order match proceeds as normal. If Firm A on the other hand refuses the deal (for whatever reason), the outstanding order or orders will be returned to the Order Book maintaining the priority level it had before the attempted matching.

Trade refusal can also be combined with credit levels, which is indicated in trade preconditions cell 404 in FIG. 4, where a credit limit of 10 is entered for Firm X. This means, in similarity with the above, that the trade refusal function will either be triggered for orders exceeding an amount of 10 or if an accumulated credit exceeds 10.

Naturally, the trade preconditions interface 401 could be further expanded by including the separate decisions for bid and offers as disclosed above in FIG. 3. Such a combination is indicated in FIG. 5 where a trade preconditions interface 501 comprises a possibility for a user to add willingness to trade with respect to bids and offers as well as providing credit limits for the trading.

Going back to the embodiment in FIG. 2, it should be noted that even though Firm A is willing to trade will all possible counterparties, this does not mean that the others are equally willing to trade with Firm A. In FIGS. 6 through 9, example embodiments of how the other Firms have entered trader preconditions are shown.

In FIG. 6 the user Firm B has indicated agreement to trade with all other users but Firm C.

In FIG. 7 the user Firm C has indicated agreement to trade with all other users but Firm A. This means that even if Firm A is willing to trade with Firm C, Firm C does not share this willingness and hence, there will be no trades between these two Firms.

FIG. 8 shows how the user Firm D has also agreed to trade with all but Firm A. FIG. 9 shows the user Firm X has given its consent for trade with all counterparties.

All the trader preconditions received through the trader preconditions interfaces must be compiled and utilized in an appropriate manner to safeguard that every user's requirements are fulfilled.

FIG. 10 shows one example way of doing this by collecting the preconditions into a trader matrix 1001. This embodiment of the trader matrix 1001 comprises one row and one column for each user and in the corresponding cells the trade handling rule established by compiling the preconditions is given. This means for instance that a first user row 1002 (for Firm A) now specifies that trade will not be made with Firm C and Firm D (even though Firm A would have been willing to trade with those).

The rules established from the trader matrix 1001 comprises an additional requirement for the trading system to consider when matching orders and may thus prevent otherwise matching orders from being matched.

To explain this further FIG. 11 illustrates a trading situation showing details concerning which firm has made which order. This precondition is only available to the trading system in an anonymous system and not to the users.

From this precondition, it is clear that Firm C has placed a bid (buy price) of 99,2 for a size (volume) of 5 (of the particular financial instrument in question); Firm A has placed a bid of 99,0 for a size of 10; Firm B has placed an offer (sell price) of 99,1 for a size of 10; and Firm D has placed an offer of 99,3 for a size of 5. Firm X has not placed any orders into the trading system.

In a situation such as this, based only on the offers present, Firm C's bid should be matched with half of Firm B's offer (i.e. Firm C buys 5 from Firm B). However, Firms B and C cannot trade (see trade matrix in FIG. 4, cell for Firm B and C), so the trading system cannot match this into a trade.

The current situation will also be broadcast to the users, so that they can see it. But they cannot see what Firm is behind a certain order. FIG. 12 shows what preconditions a broadcast can include. The notable difference from the situation in FIG. 11 is that users have been accorded IDs. These IDs are generated by the trading system and regularly changed to maintain the anonymity.

Thus, the trading system has generated the following IDs:

Firm A 99

Firm B 12

Firm C 03

Firm D 21

Firm X 34

There are different ways of handling how the information is to be displayed to the users.

One example is indicated in FIG. 13 and provides the specific information that Firm A will be able to see. As was made clear in the trader matrix (FIG. 10), Firm A will only be able to trade with Firm B and Firm X. Firm X has no current orders, but Firm B has an offer of 99,1 for 10 (FIG. 11). Of course, Firm A will also be able to see their own bid. Therefore, as shown in FIG. 13, Firm A will see their own bid (possibly believing it is the currently best bid) and Firm B's offer.

Figures 14, 15:
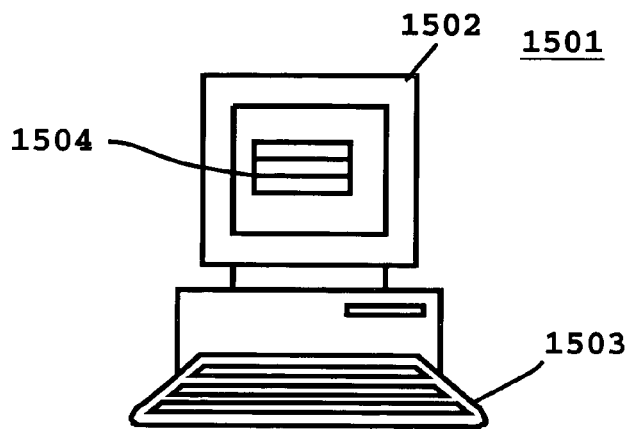
FIG. 14 shows an alternative example of how the distributed trading information in FIG. 11 can be displayed to a user after consideration of trader preconditions in the trader matrix in FIG. 10.
FIG. 15 shows an example embodiment of a terminal for entering orders in a financial market system.

The second example way is shown in FIG. 14, where instead of completely removing non-tradable bids and offers, they are all shown, but differently displayed (different colouring, or other way of highlighting a difference). This provides Firm A with more preconditions without risking the anonymity of the overall system.

A terminal 1501 for sending in orders to an anonymous trading system is shown in FIG. 15. The terminal comprises a screen 1502 for displaying information and a keyboard 1503 for entering information. An interface 1504 for entering trader preconditions is displayed on the screen 1502.

We claim:

1. A method for use in an anonymous trading system enabling users to select order preconditions including price, volume, and bid or offer and counterparty trader preconditions, said method comprising,
   providing each user with an interface via which each user may add trader preconditions regarding available counterparties, which trader preconditions at least comprises an expression of the user's willingness to trade with selected counterparties that does not necessarily depend on a credit rating for each of the selected counterparties;
   collecting all added trader preconditions from the users;
   combining the trader preconditions into a trader precondition matrix;
   using the trader precondition matrix and order preconditions for determining matching criteria for orders sent in by users;
   wherein the method further comprises:
      assigning a unique identity alias to each of multiple users;
      displaying the unique identity alias in relation to displayed orders to maintain anonymity of the users; and
      subsequently assigning and displaying a new unique identity alias to each of the users when a predetermined condition is met.

2. The method according to claim 1, wherein the method further comprises:
   using the trader precondition matrix for selecting order information to be viewed to each user.

3. The method according to claim 1, wherein the step of providing each user with an interface via which each user may add trader preconditions regarding available counterparties comprises allowing each user to alter the added trader preconditions a specific number of times within a predetermined time frame.

4. The method according to claim 1, wherein the step of providing each user with an interface via which each user may add trader information regarding available counterparties comprises providing one separate interface for each financial instrument type that is traded on the trading system.

5. The method according to claim 1, wherein the step of providing each user with an interface via which each user may add trader preconditions regarding available counterparties comprises providing one separate interface for bid orders and one for offer orders.

6. The method according to claim 1, wherein the users add a credit limit trader precondition.

7. The method according to claim 6, wherein the credit limit relates to individual orders.

8. The method according to claim 6, wherein the credit limit relates to an accumulated trade credit.

9. A computer-based anonymous trading system for trading financial instruments, comprising:
   a matching server for matching received orders having corresponding order requirements including price, volume, and bid or offer conditions,
   an order book memory for storing unmatched orders,
   a trader precondition matrix memory containing trader preconditions including a user's willingness to trade with selected counterparties, which willingness to trade represents a further requirement for the received orders in addition to the order requirements, and
   a user book server for assigning a unique identity alias to each of multiple users, wherein the unique identity alias is distributed for display in relation to displayed orders to maintain anonymity of the users,
   wherein the user book server subsequently assigns and distributes for display a new unique identity alias to each of the users when a predetermined condition is met.

10. The anonymous trading system according to claim 9, wherein the trader precondition matrix determines how order information from the order book is to be displayed to each user.

11. The anonymous trading system according to claim 9, wherein the trader preconditions in the trader precondition matrix can only be altered a specific number of times within a predetermined time frame.

12. The anonymous trading system according to claim 9, wherein the trader precondition matrix comprises unique trader preconditions for each financial instrument type that is traded on the trading system.

13. The anonymous trading system according to claim 9, wherein the trader precondition matrix comprises unique trader preconditions for bid orders and offer orders respectively.

14. The anonymous trading system according to claim 9, wherein the trader precondition matrix further comprises trader preconditions related to a credit limit.

15. The anonymous trading system according to claim 14, wherein the credit limit relates to a credit limit for individual orders.

16. The anonymous trading system according to claim 14, wherein the credit limit relates to an accumulated trade credit.

17. A terminal for use in sending orders to the anonymous trading system in claim 9, comprising:
   an order interface for inputting order requirement including price, volume, and bid or offer preconditions, and
   an interactive trader preconditions interface into which a user may add trader preconditions relating to willingness of trading with selected counterparties.

18. The anonymous trading system according to claim 9, wherein the user's willingness to trade with selected counterparties does not depend on a credit rating for each of the selected counterparties.

* * * * *